May 29, 1934.  H. J. TYZZER  1,960,834

CONDENSER

Filed Feb. 23, 1932

INVENTOR.
HOWARD J. TYZZER.
BY *Wm. H. Atkinson*
ATTORNEY

Patented May 29, 1934

1,960,834

UNITED STATES PATENT OFFICE 1,960,834

CONDENSER

Howard J. Tyzzer, Lawrence, Mass., assignor to The Magnavox Company, Chicago, Ill., a corporation of Arizona Application February 23, 1932, Serial No. 594,717

7 Claims. (Cl. 175—315)

My present invention relates to condensers, etc., and more particularly to a process for forming and operating electrolytic condensers of the filmed electrode type.

An object of my invention is to provide a process for forming the electrode of an electrolytic condenser which will produce a condenser having improved characteristics.

A further object of my invention is to provide a condenser of the filmed electrode type that will have a low leakage current at its normal operating voltage and which will also be capable of taking care of higher voltage surges without damage.

Another object of my invention is to provide a novel method of operating filmed electrode condensers on an alternating current circuit.

As is well known, the action of electrolytic condensers, rectifiers, and similar devices depends upon the film which may be formed upon the surface of aluminum, tantalum, magnesium and other metals when immersed in certain electrolytes and subjected to the electric current; which film possesses the singular property of allowing current to flow from the electrolyte to the electrode with but little opposition, but of strongly opposing current tending to flow from the electrode to the electrolyte. To current tending to flow in the direction last indicated the film, although excessively thin, possesses high specific resistance and high dielectric strength, being able to withstand very considerable voltages without rupture, and with very inconsiderable leakage current.

It has been found, however, that in order that the film shall evidence to an efficient degree the qualities of high specific resistance and high dielectric strength its forming voltage must bear some definite relation to the voltage at which the condenser is to operate; and that as the voltage of the condenser, in operation, approaches this value the film begins to lose these good qualities, the impairment of the behavior of the film above this voltage being very marked. In all the devices of this character depending upon the existence of such a film for their action there is a certain amount of leakage current.

Figure 1:
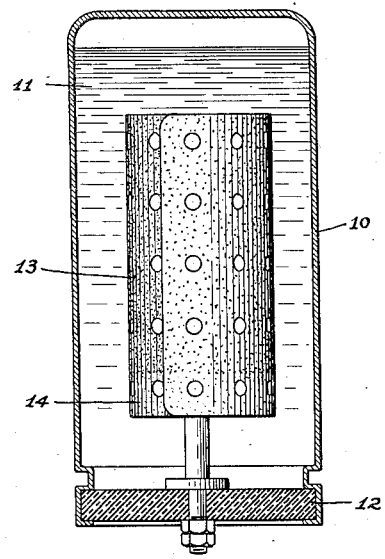
Figure 2:
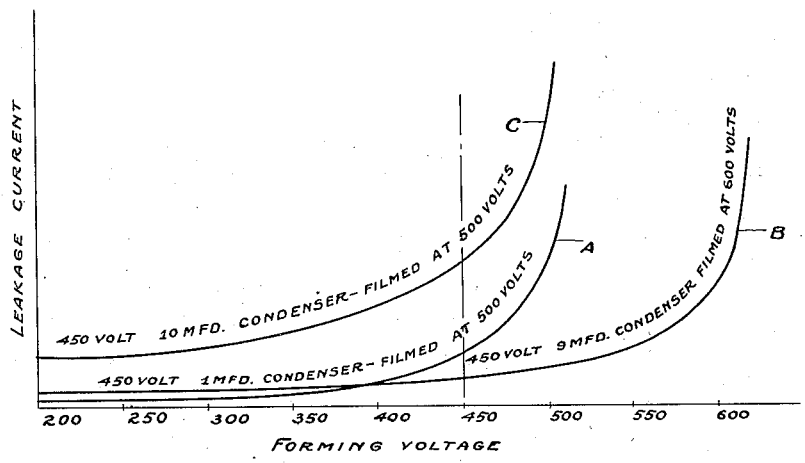

In the accompanying drawing wherein I have shown by way of illustration and not of limitation a preferred embodiment of my invention;

Figure 1 is a sectional elevation of an electrolytic condenser filmed in accordance with this disclosure, and Figure 2 shows a series of graphic curves illustrating the leakage current characteristics of a standard condenser as compared with two condenser sections or condensers treated and operated in accordance with my invention.

Electrolytic condensers in general, whether of the so-called dry or liquid type, are usually provided with an electrode having a film formed by immersing the electrode in an electrolyte and applying a certain voltage. As the applied voltage under these conditions approaches this voltage in service the leakage current increases and becomes proportionately high as the formation voltage is exceeded.

It is, therefore, customary in carrying out the above film forming operation to form the condenser at a higher voltage than that at which the condenser is to be used, in order that the leakage current at the working voltage will be low as compared with what it would be if the condenser operated at the formation voltage.

This procedure, however, robs the condenser of a feature which it is desirable to retain, namely, the characteristic of absorbing surges or excess voltages which cause an increase in the leakage current and produce a consequent drain on the supply when the condenser is operating near the formation voltage.

From the above it will be evident that while it is desirable to form the film of the anode of an electrolytic condenser to a voltage higher than the working potential of the condenser to reduce the leakage current at its working voltage, this procedure has the disadvantage that the condenser so formed will not effectively absorb higher voltage surges.

Another disadvantage in this procedure is that if the condenser is formed at a high voltage, it will be easily charged to the high voltage of the surges and hence the insulation of the condenser will be subjected to a greater voltage stress.

In order to overcome the above referred to disadvantages and to also provide a capacitor having improved characteristics, I propose to form different portions of the filmed electrode at different voltages. My invention may also be practiced by operating two separate condensers in parallel with their filmed electrodes formed at different voltages.

The usual method of producing the films has been as follows: When the films are produced with alternating current at least two electrodes of equal area are used, both being of aluminum (or other suitable metal) and both immersed in a suitable electrolyte. One of these electrodes or plates is attached to one terminal of the alternating current circuit and the other plate is attached to the other terminal. Where direct current is to be used to form the films all the electrodes which are to be filmed are connected to the positive pole of the direct current source and to the other pole is connected a cathode electrode, preferably of non-filming material, say of carbon, iron, lead, or other suitable material. In either case an E. M. F. of small value is impressed on the electrodes. The current thus caused to flow promptly begins to fall in value, at first rapidly and then less and less rapidly, always approaching a definite lower limit. In the case of direct current this limit approximates zero, or at any rate has a very low value. With alternating current the limit is higher, partly because of the higher losses with alternating current but chiefly because of the charging or condenser-current component. In general it is better, when using alternating current, to depend upon the indications of a wattmeter rather than an ammeter, as wattmeter readings will not be masked by the large charging component. If, after the current has ceased to fall rapidly, the E. M. F. be increased the current flowing will increase coincidently, again falling toward a limiting value. By increasing the voltage in this manner, that is, by relatively small steps, or by leaving at any step a constant voltage until the current has fallen to an approximately constant value in the case of alternating current, or to a very low value in the case of direct current, a film of maximum resistance and dielectric strength may be built up, capable of withstanding very considerable voltages, as before stated. There is, however, a certain maximum voltage, depending, as is well known upon the kind of metal used in the filming electrodes and the chemical used in the electrolyte, at which the film breaks down and beyond which the forming process cannot be carried. It is of course clear that the forming voltage should not exceed this maximum value.

From the above it will be clear that the dielectric strength and the resistance of the film of any filmed electrolytic condenser, as well as its leakage current, will be determined by the voltage applied in the film forming operation. In other words, the higher the voltage used in forming the film the greater the dielectric strength and resistance of the condenser and the smaller will be the leakage current for any given voltage below the formation voltage. However, since a condenser is often subjected to high voltage surges it is desirable that some means be provided to permit these surges to be dissipated without causing injury to the condenser insulation.

To accomplish this latter feature and at the same time provide a condenser which will have high dielectric strength and resistance at its normal operating voltage, I form a high voltage film on a large portion of the electrode and form the remaining portion of the electrode at a lower voltage. With respect to the area of electrode so treated, I may film ninety per cent (90%) of the electrode at a potential considerably in excess of the normal voltage for which the condenser is designed and form the remaining ten per cent (10%) of the electrode at a lower voltage which should be only slightly above the normal operating voltage of the condenser.

In Figure 1 of the drawing I have illustrated a form of condenser which is particularly suited to my present invention. In this figure of the drawing 10 designates a copper container in which an electrolyte 11 is retained. The bottom of the container 10 is closed by an insulating member 12. Supported upon the member 12, I show an electrode having portions 13 and 14 filmed at different voltages in accordance with the above outlined procedure.

For a concrete example, in the case of a ten micro-farad condenser designed to operate at 450 volts, I form a section 13 corresponding to a capacity of nine micro-farads at 600 volts or higher and form the remaining one micro-farad section 14 at approximately 500 votes. With this type of filmed electrode the nine micro-farad section 13 will have a high dielectric strength and a comparatively low leakage current and the one micro-farad section 14, because of its small area and capacity, will also have a low leakage current, as long as the normal operating voltage of 450 volts is not exceeded. Due to the fact, however, that the leakage of a filmed condenser increases very rapidly when its forming voltage is approached and/or exceeded it will be seen that the one micro-farad section 14 of my condenser will provide a leakage path for the dissipation of excess current caused by any higher voltage surges.

When such a condenser is operating at its normal voltage of 450 volts it will have a low leakage, but should the voltage increase to 500 volts (the film forming voltage of the one micro-farad section) this latter section will draw a comparatively high leakage current and absorb the excess voltage and thus protect the larger nine micro-farad section against the stress of voltages in excess of 500 volts. In effect the one micro-farad section of the condenser will operate in much the same manner as does an aluminum lightning arrester in holding down surges on a power transmission system.

The above is clearly illustrated in Figure 2 of the drawing, wherein it will be seen that the one micro-farad condenser filmed to 500 volts and represented by the curve A will break down rapidly at voltages in excess of 450 volts and thus dissipate any excess current without subjecting the major portion of the condenser represented by the curve B to this excess current.

The curve C in this figure of the drawing represents the performance of a ten microfarad condenser filmed uniformly at 500 volts. A comparison of the curve C with the curves A and B will clearly illustrate the advantages obtained by my invention.

Instead of forming different areas of a single electrode at different voltages, I may provide separate electrodes formed at different voltages in the same condenser or I may obtain the same advantages with two or more separate condensers having filmed electrodes formed at different voltages by connecting the condensers in parallel.

In this latter event it will be obvious that the larger condenser need not necessarily be of the filmed electrode type. It can be a paper insulated or any other type of condenser having a low leakage current, a high dielectric strength and insulation resistance, and still the smaller condenser of the filmed electrode type will protect the larger condenser, in the manner suggested above, against any voltages in excess of the voltage applied in forming its dielectric film.

While I have, for the sake of clearness and in order to disclose my invention so that the same can be readily understood, described specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. A formed anode for electrolytic apparatus having definite filmed areas of different dielectric strengths.

2. An anode for electrolytic condensers having filmed areas of at least two different dielectric values formed upon its surface.

3. An anode for electrolytic apparatus having filmed areas of different electrical resistance formed upon its surface.

4. An electrode for electrolytic apparatus having filmed areas of different dielectric strength and resistance formed upon its surface.

5. An anode for electrolytic apparatus having filmed areas of different dielectric strength formed upon its surface.

6. In a capacitor of the electrolytic type, an anode having a relatively large filmed area of one dielectric strength, and a smaller filmed area of a lower dielectric strength.

7. In an electrolytic condenser, a single anode having a definite portion with a film of one dielectric strength and its remaining portion with a film of another dielectric strength.

HOWARD J. TYZZER.